United States Patent
Madden

(10) Patent No.: US 9,432,346 B2
(45) Date of Patent: Aug. 30, 2016

(54) PROTOCOL FOR CONTROLLING ACCESS TO ENCRYPTION KEYS

(71) Applicant: David H. Madden, Portland, OR (US)

(72) Inventor: David H. Madden, Portland, OR (US)

( * ) Notice: Subject to any disclaimer, the term of this patent is extended or adjusted under 35 U.S.C. 154(b) by 52 days.

(21) Appl. No.: 14/512,448

(22) Filed: Oct. 12, 2014

(65) Prior Publication Data

US 2015/0033020 A1    Jan. 29, 2015

Related U.S. Application Data

(62) Division of application No. 13/534,633, filed on Jun. 27, 2012, now Pat. No. 8,862,889.

(60) Provisional application No. 61/504,198, filed on Jul. 2, 2011.

(51) Int. Cl.
*H04L 29/06* (2006.01)
*H04L 9/08* (2006.01)
*G06F 21/62* (2013.01)

(52) U.S. Cl.
CPC ......... *H04L 63/061* (2013.01); *G06F 21/6218* (2013.01); *H04L 9/0822* (2013.01); *H04L 9/0894* (2013.01); *H04L 63/0442* (2013.01)

(58) Field of Classification Search
CPC ............. H04L 63/061; H04L 63/0442; H04L 9/0822; H04L 9/0894; G06F 21/6218
USPC .................................. 713/171, 179
See application file for complete search history.

(56) References Cited

U.S. PATENT DOCUMENTS

| | | | | |
|---|---|---|---|---|
| 6,098,056 A * | 8/2000 | Rusnak | ............... | G06Q 20/3821 705/75 |
| 6,834,112 B1 * | 12/2004 | Brickell | ................... | G06F 21/31 380/279 |
| 2002/0004902 A1 * | 1/2002 | Toh | ..................... | H04L 63/0442 713/170 |
| 2002/0095569 A1 * | 7/2002 | Jerdonek | ................... | H04L 9/32 713/155 |
| 2002/0178366 A1 * | 11/2002 | Ofir | ..................... | G06F 21/6245 713/182 |
| 2003/0079133 A1 * | 4/2003 | Breiter | ................... | G06F 21/10 713/182 |
| 2004/0001595 A1 * | 1/2004 | Hopkins | ................ | H04L 9/088 380/277 |
| 2004/0117649 A1 * | 6/2004 | Whyte | ................. | H04L 9/0891 380/286 |
| 2005/0033963 A1 * | 2/2005 | Ronchi | ................ | H04L 9/0822 713/170 |
| 2006/0129824 A1 * | 6/2006 | Hoff | ..................... | H04L 9/3234 713/176 |
| 2006/0224470 A1 * | 10/2006 | Garcia Ruano | ........ | G06Q 20/04 705/26.1 |
| 2007/0033419 A1 * | 2/2007 | Kocher | ................... | G06F 21/10 713/193 |
| 2007/0220274 A1 * | 9/2007 | Jensen | ................... | G06F 21/32 713/186 |
| 2008/0120504 A1 * | 5/2008 | Kirkup | ................... | H04L 9/003 713/176 |
| 2012/0174198 A1 * | 7/2012 | Gould | ................. | H04L 63/0807 726/6 |
| 2013/0013921 A1 * | 1/2013 | Bhathena | .............. | H04L 9/0825 713/168 |
| 2013/0219166 A1 * | 8/2013 | Ristov | ................ | H04L 63/0853 713/151 |

* cited by examiner

*Primary Examiner* — Michael S McNally
(74) *Attorney, Agent, or Firm* — Mersenne Law

(57) ABSTRACT

A secure remote-data-storage system stores encrypted data and both plaintext and encrypted keys at a server, where data at the server is inadequate to recover the plaintext of the encrypted data; and stores at least one encrypted key at a client system. To decrypt the data, the client must obtain a copy of the encrypted data from the server, and a key to decrypt its locally-stored encrypted key. Once decrypted, the locally-stored key can be used to decrypt the encrypted data, or to decrypt an encrypted key from the server, which may then be used decrypt the encrypted data.

8 Claims, 14 Drawing Sheets

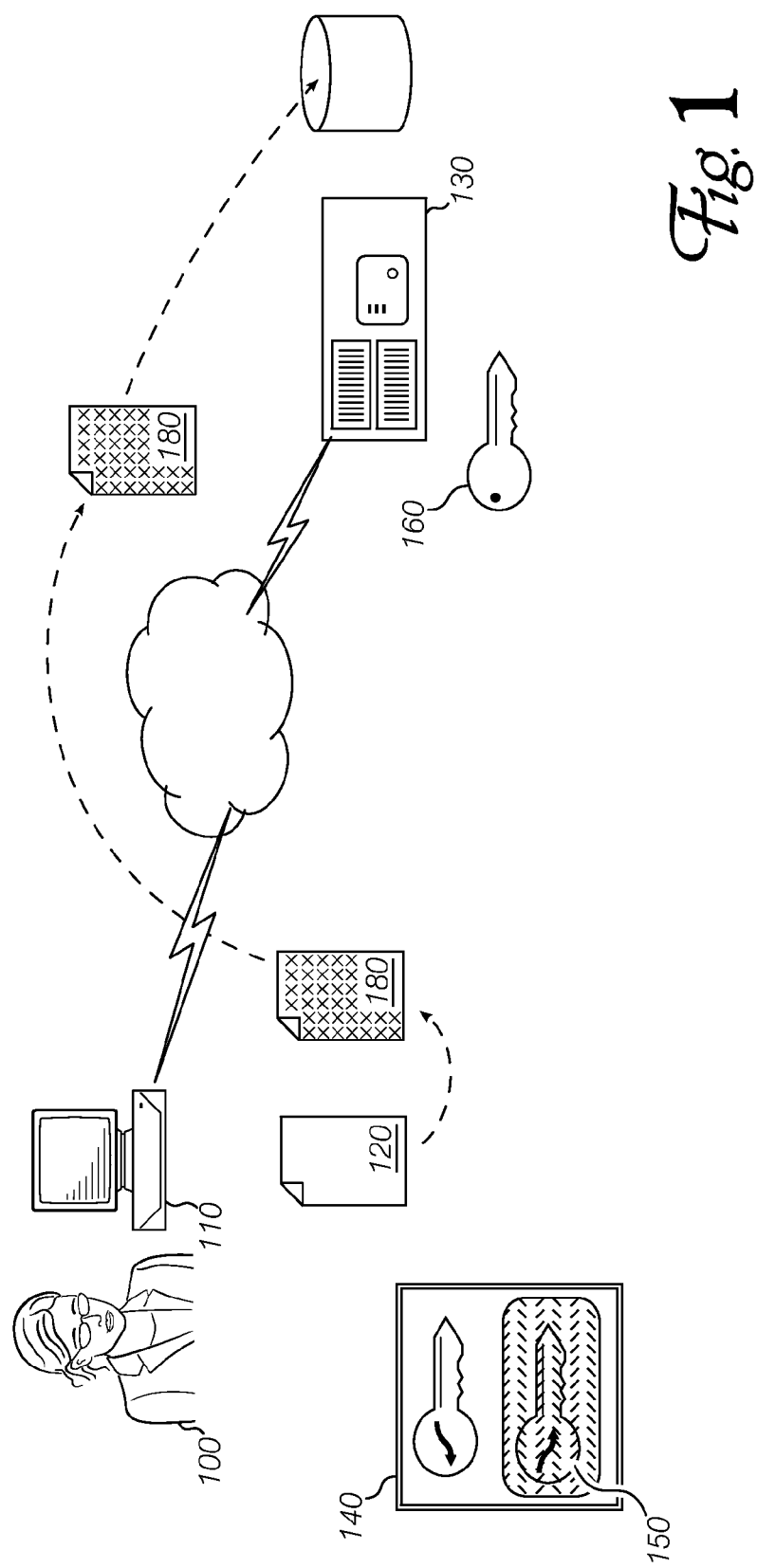

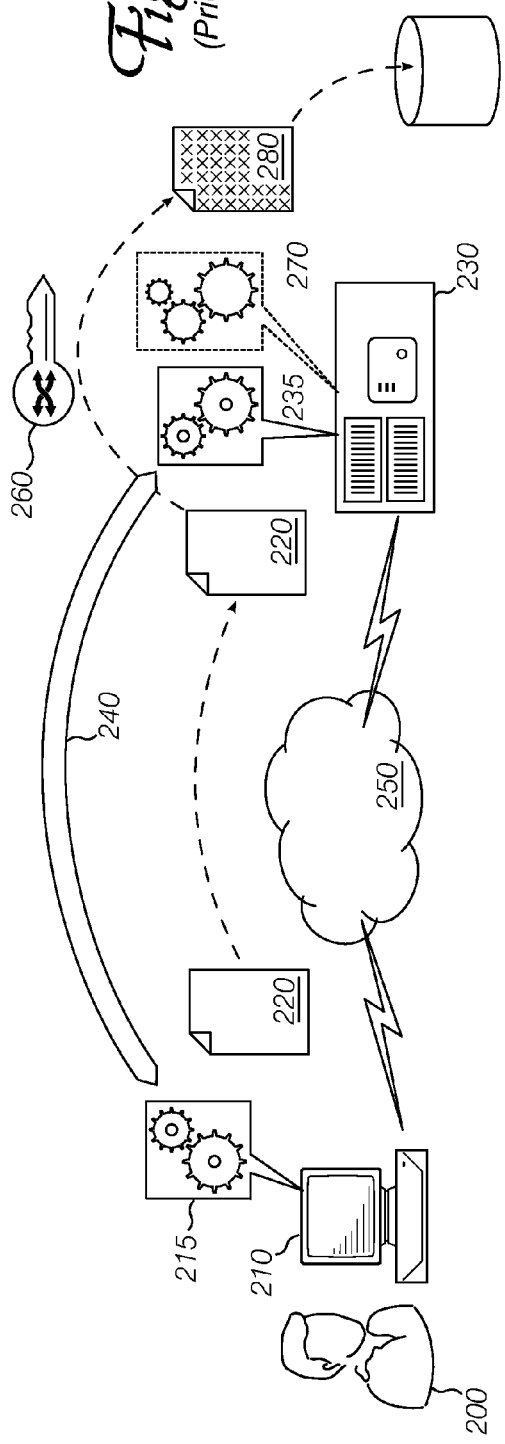
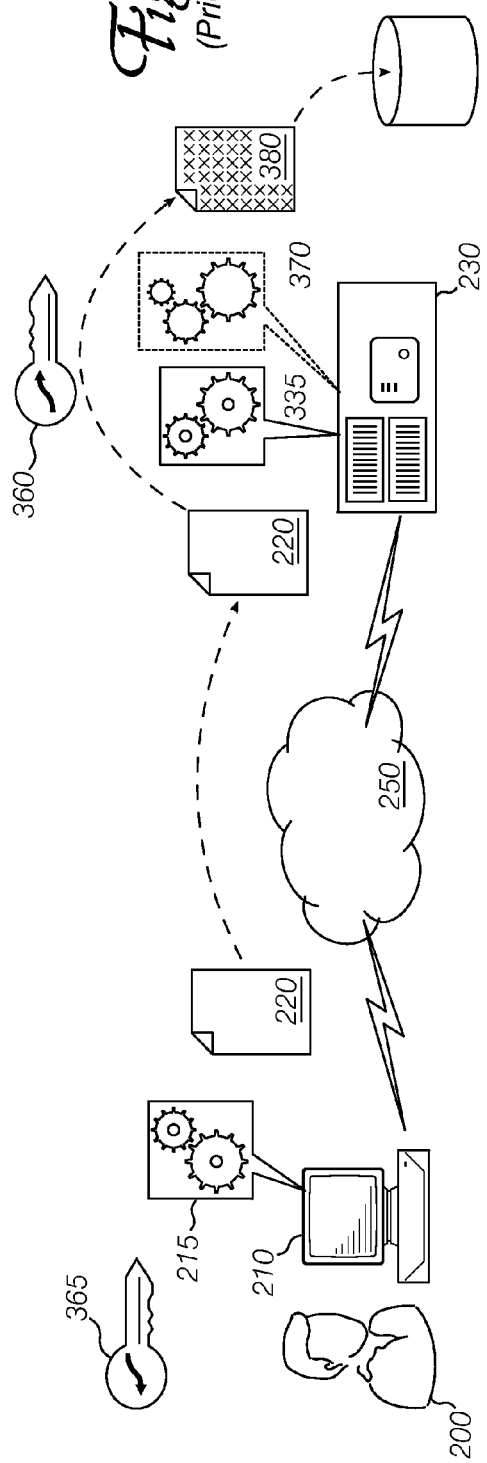

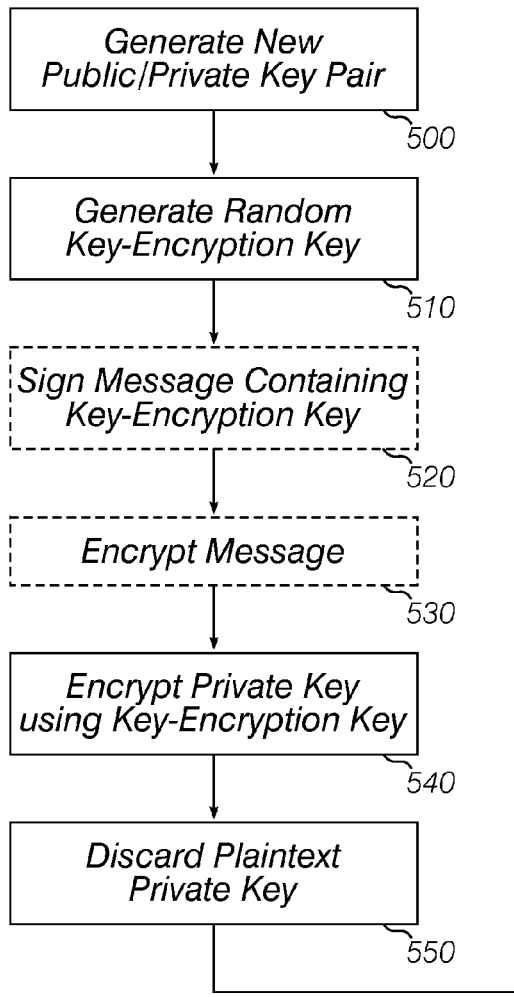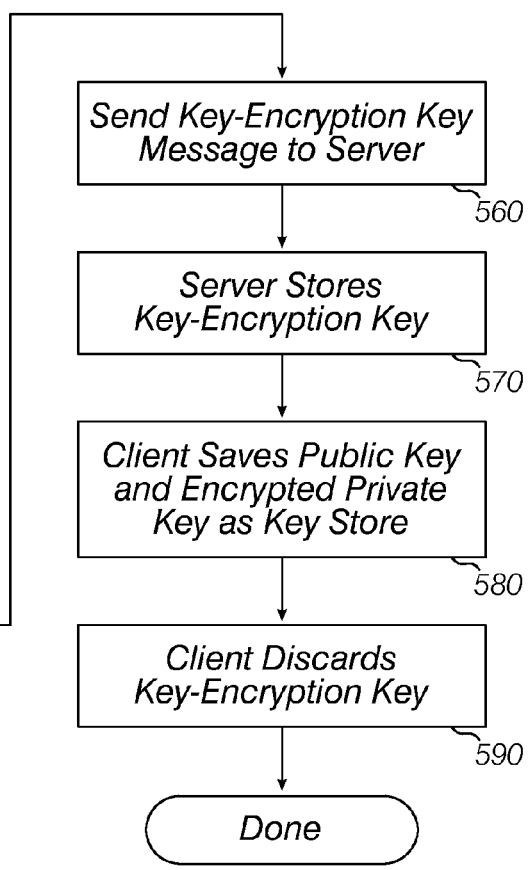
Fig. 5

USER_INFORMATION

| Name Key | Name | Address Key | Address | Phone Key | Phone | Contact Key | Contact |
|---|---|---|---|---|---|---|---|
| ∅ | John Doe | -7 | eX*2{?b! | ∅ | 555-1234 | ∅ | Michael Cox |
| 12 | X8_a#i)4 @z | ∅ | Kansas | 2 | `#m=X9 | 18 | j3lm,^eD\|p" |
| ∅ | Mary Smith | 331 | 44)<d2-/ | ∅ | 789-6543 | 12 | H3_r9+xW&j |

Fig. 12

PROTOCOL FOR CONTROLLING ACCESS TO ENCRYPTION KEYS

CONTINUITY AND CLAIM OF PRIORITY

This is a divisional U.S. patent application that claims priority to U.S. provisional application No. 61/504,198 filed 2 Jul. 2011 and U.S. utility patent application Ser. No. 13/534,633 filed 27 Jun. 2012 (now U.S. Pat. No. 8,862,889).

FIELD

The invention relates to information security and access management. More specifically, the invention relates to techniques for controlling access to data encryption/decryption keys so that system attacks are made more difficult.

BACKGROUND

Computers often store sensitive, confidential or secret data. If the computer itself is physically secured, is only used by people who are permitted access to the data, and is protected from remote access, the data may be reasonably safe from inadvertent disclosure. However, these sorts of restrictions severely impair the usefulness of a computer; people usually want to exchange data with other systems, and often must use a portable computer in arbitrary (non-secured) locations. To protect the sensitive data a computer may contain, many users rely on cryptographic systems.

A cryptographic system protects data by encrypting it with a key. If the encryption algorithm is strong and the key is chosen carefully, then it is infeasible to recover the original plaintext without the key. Thus, the encrypted, sensitive data need not be maintained with the same degree of care—an attacker who obtains the encrypted data will be unable to do anything with it. (On the other hand, the key becomes the focus of an attacker's attention, since the key provides access to all data encrypted therewith.)

At first blush, then, it might seem that encryption merely exchanges one security problem (restricting access to data) for another (restricting access to a key), but keys are typically much smaller than the data they are used to encrypt, and so different techniques for protecting them are feasible and effective. In fact, many security problems boil down to key management issues. New protocols and techniques for managing keys to achieve specific security profiles may be of significant value.

SUMMARY

Data encryption keys are subjected to successive encryptions with other keys to form a multi-layer key object. The key(s) for the successive encryptions are distributed among entities, each of which is responsible for confirming or establishing a condition or prerequisite, so that the data can only be accessed if all the conditions or prerequisites are met. Key-encrypting keys can also be arranged to enforce predetermined logical combinations of conditions (for example, a document-encryption key may become accessible if (1) a key-encrypting key linked to a physical location is accessed, and (2) a key-encrypting key linked to a personal identification of John Doe or (3) a key-encrypting key linked to a personal identification of Jane Doe, are available). If responsibility for the various key-encrypting keys is distributed appropriately, document security can be controlled with great precision.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 1 shows an environment where an embodiment of the invention can be applied.

FIG. 2 shows a prior-art method that purports to accomplish secure remote storage of data.

FIG. 3 shows a slightly improved prior-art method for remote data storage.

FIG. 5 outlines a method for enrolling a client into a secure remote data storage system according to an embodiment of the invention.

FIG. 12 illustrates some features of a database that may be useful in embodiments of the invention.

DETAILED DESCRIPTION

Figure 4:
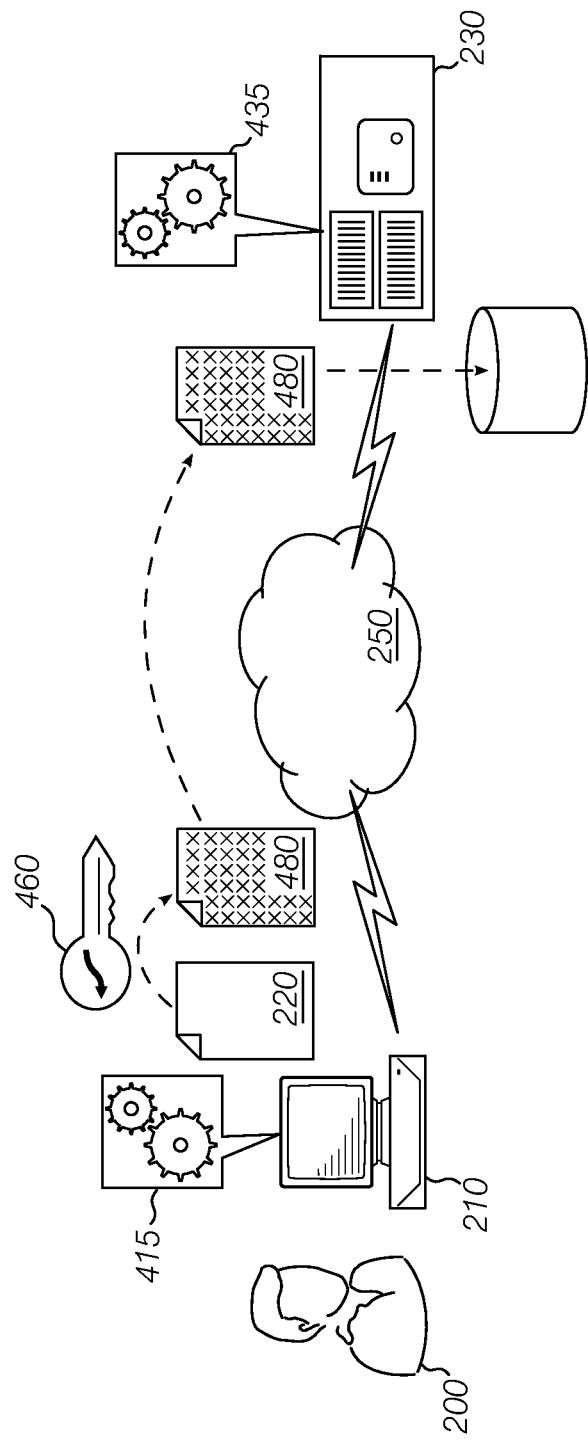
FIG. 4 shows another improved prior-art method for remote data storage.

Embodiments of the invention specify a data exchange protocol to be performed between a user's computer and a server computer. The protocol permits the server to receive encrypted data from the user's computer and to control the user's subsequent access to that data, without obtaining information that would allow the server to access the plaintext of the encrypted data. This separation of knowledge, access and control may be useful in a number of client/server applications. Multiple data exchanges, among user's computer, server, and other computers, may be used to refine the conditions under which encrypted data may be accessed.

FIG. 2 shows a conventional "secure" remote storage protocol. A user 200 at his computer 210 has a plaintext document 220 that he wishes to store at a remote server 230.

(Remote storage may be useful to back up the document, or to make the document accessible to another user at a different computer (or accessible to user 200 himself, when he is working at a different computer). Software 215 running at 210 establishes a data connection 240 to complementary software 235 running at server 230 (the data may travel over a distributed data network 250 such as the Internet). This data connection may be encrypted to protect against eavesdroppers and/or man-in-the-middle ("MITM") attacks; frequently, such encryption is provided by a communication protocol called "Secure Sockets Layer" or "SSL."

Software 215 transmits plaintext document 220 to software 235. When the plaintext document arrives, it is encrypted using a key 260 available at server 230 (encryption may be performed by software 235, or by a separate software process 270). Finally, the encrypted document 280 is stored at the server.

This arrangement lacks security because server 230 must have key 260 available so that it can perform the encryption; since the key is available, an attacker who manages to access server 230 can obtain all the information he needs to recover the plaintext document.

FIG. 3 shows a slightly-improved conventional approach to "secure" remote storage. Here, software 335 (or 370) uses a one-way encryption key 360 to encrypt plaintext document 220 before storing it as encrypted document 380. A one-way encryption key allows a document to be encrypted, but not decrypted. (A complementary one-way key 365 is needed to decrypt document 380). One-way key 365 may be stored elsewhere, such as at user 200's computer 210. (One-way, or asymmetric, encryption systems are also known as "public key" systems. In this example, key 360 would be user 200's "public key," while key 365 would be his "private key.") This arrangement offers somewhat improved security over the system of FIG. 2: even if an attacker obtains access to server 230 and retrieves one-way key 360 and encrypted document 380, he cannot decipher the document without private key 365. However, user 200 must trust server 230 to encrypt and store his document properly, and not to make a copy of the plaintext as it does so. If server 230 is compromised before user 200 uploads his document, then an attacker may be able to steal plaintext documents as they are processed through the encryption software.

FIG. 4 shows yet another conventional approach to the problem of secure, remote data storage. In this environment, plaintext document 220 is encrypted at computer 210 (using key 460), before it is sent to server 230. In this system, software at the server never has access to plaintext document 220, and there is no key to decrypt document 480 stored at server 230, so the server is a relatively uninteresting target for an attacker. As these examples show, client-side encryption offers much better security than server-side encryption, but there is a corresponding decrease in system flexibility as the server loses the ability to deliver plaintext copies of the document to other users, unless those users have the appropriate decryption keys. (And, true to expectations, the problem of distributing those keys to users who should have them, and keeping them from attackers who should not, becomes the focus of the system design.)

FIG. 1 shows an environment where an embodiment of the invention can be used to support a secure remote data storage system. Similarly to the conventional arrangements described with reference to FIGS. 2-4, a user 100 at a computer 110 wishes to store a plaintext document 120 securely at a server 130. User 100 has a key store 140 prepared as discussed below, containing the user's encryption keys 150 (an unencrypted public key and an encrypted private key, the private key encrypted by a key-encryption key 160, which is stored at server 130).

To accomplish secure remote storage, user 100 establishes her identity to server 130 using an identification and/or authentication process designed to provide a desired level of confidence that the user is who she says she is, then server 130 transmits key-encryption key 160 to computer 110. (Prior to identification, computer 110 has an encrypted copy of key 150 in its key store 140, but it cannot examine or use the key.)

Once computer 110 receives the key-encryption key 160, it unlocks (decrypts) the user's encryption key 150, and uses key 150 to produce ciphertext document 180. Encrypted document 180 is transmitted to server 130 and stored there. Now, an attacker who obtains access to key-encryption key 160 and encrypted document 180 at server 130 cannot do anything with them; and an attacker who obtains key store 140 and encrypted document 180 from computer 110 is equally unenlightened. (Of course, an attacker who is particularly interested in plaintext document 120 would be likely to attempt to get that directly from computer 110, but embodiments of the invention can be applied in more sophisticated processes to move or multiply the targets an attacker must compromise to gain access to the protected data.) Note that the process and distribution of keys describe here is slightly simplified from a practical implementation, to serve as an introduction to the inventive concepts. Subsequent descriptions of embodiments are made with significantly more rigor.

In the balance of this Specification, we will describe aspects of embodiments in the context of a client/server system, where a user of the client system wishes to upload documents for secure remote storage at the server, and to retrieve and view those documents later (with various restrictions on the capability to retrieve and review). For security purposes, the server system is presumed to have been compromised, and data stored there is presumed to be available to an attacker. (This presumption is obviously a worst-case scenario, but if the system is designed to resist such a compromise, then its security will only be improved to the extent that the server can be protected from attack.)

FIG. 5 outlines a method for enrolling a new user, who will then be able to take advantage of secure online data storage using an embodiment of the invention. First, software at the user's computer generates a public-private keypair (500) (for example, an RSA keypair). Next, the user's computer generates a random key-encryption key (510). It is appreciated that truly random numbers are difficult to generate at a computer. In some environments, a server may offer a random (or pseudo-random) bitstream based on a chaotic physical process. This bitstream may be used to perturb an algorithmic pseudo-random number generator ("PNRG") at the client in unpredictable ways, allowing the generation of improved random (or pseudo-random) numbers.

The client may "sign" a message containing the key-encryption key using its private key (520), and may encrypt the message using a public key of the server (530). Now, the private key of the keypair is encrypted using the key-encryption key (540) and the unencrypted (plaintext) private key is discarded (550). Finally, the (possibly-signed, possibly-encrypted) message containing the key-encryption key is transmitted to the server (560), where it is stored (570). The client stores its newly-generated keypair (the private key is encrypted), as the "key store" mentioned above as element 140 of FIG. 1 (580) and discards the key-encryption key (590). Client enrollment is then complete. (Note that additional security measures may be taken at the client. For example, the key store may be encrypted again, using a password or biometric-based encryption process.) However, the key store data is not tremendously sensitive, as it cannot be used without also obtaining key-encryption key from the server.

Figure 15:
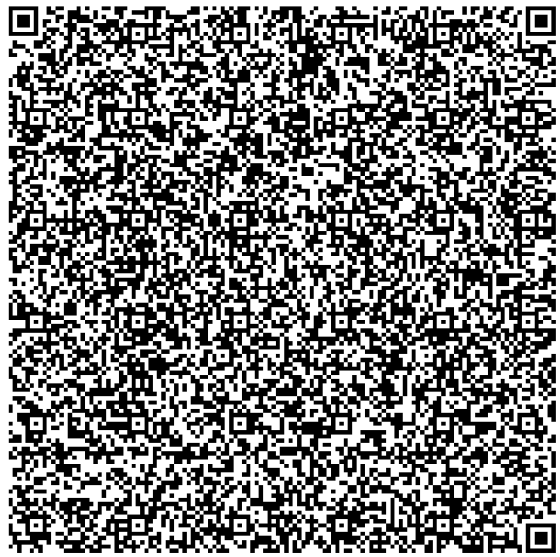
FIG. 15 is a sample printable key store (hardcopy backup).

In some embodiments, the client enrollment process also includes preparing a backup copy of the key store. For example, a machine-readable version of the key store may be saved on a portable Flash drive, or printed out as a bar code or QR Code®. The server may send software to allow the client to create this bar code or QR Code. In one preferred embodiment, a QR Code containing the key store (i.e., the public key and the encrypted private key) is prepared for printing on a standard-sized sheet of self-adhesive labels. These labels may be affixed to important documents such as wills, trusts, contracts and the like, so that encrypted digital data stored in the system can be recovered even if the user becomes incapacitated or dies. FIG. 15 shows a sample QR Code, printed on an Avery® 5164-size self-adhesive label.

Again, these backup copies of the key store are not tremendously sensitive, as they are useless without the key-encryption key that is stored at the server. It is appreciated that the key store must not be made available to the server, since the server would then have all the information necessary to masquerade as the user, or to read her documents. However, one user's key store can be sent to the server if it is treated as private data of a second user. For example, a lawyer may assist his client in enrolling in the system, and then save a copy of the client's key store in the lawyer's secure storage account. Since the server cannot examine the lawyer's private data, it cannot obtain a plaintext copy of the client's key store, and therefore cannot impair the client's security. Furthermore, the lawyer cannot use the client's key store for nefarious purposes, since he will be unable to obtain the client's key-encryption key from the server (he can only obtain his own key-encryption key).

Once the client is enrolled, it has a key store (that it cannot use directly, since the private key is encrypted with the key-encryption key, which the client does not have), and the server has the key-encryption key.

Figure 6:
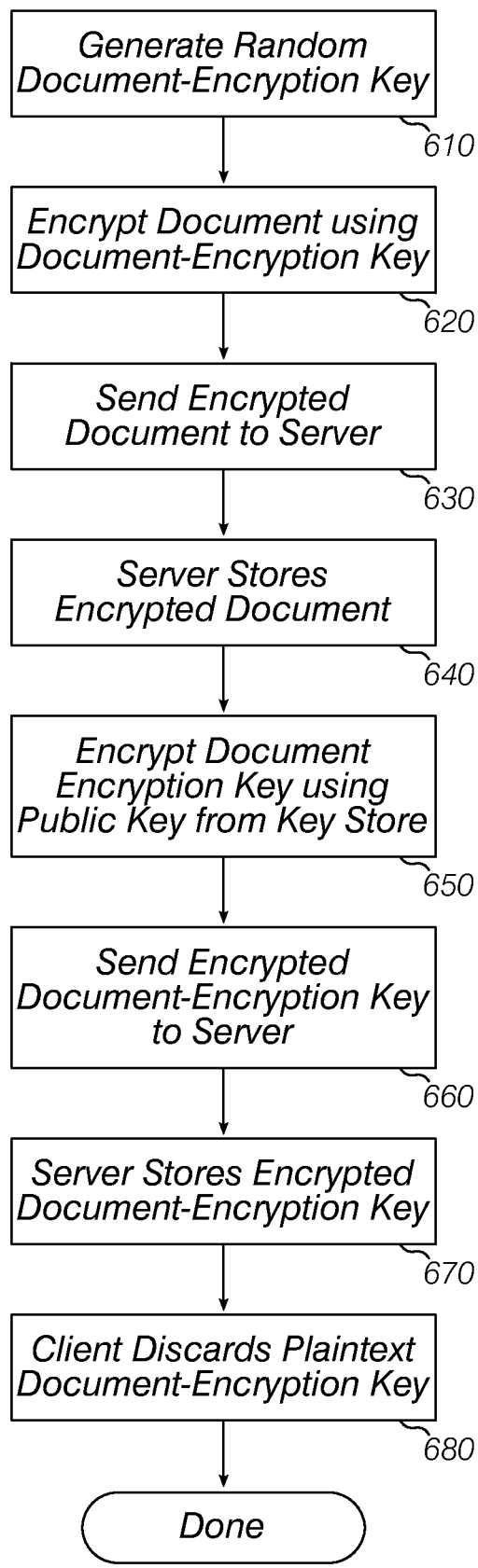
FIG. 6 outlines a method for sending data to a remote system for secure storage there, according to an embodiment of the invention.

Now, to upload a plaintext document for secure storage at the server, the client can follow the procedure outlined in FIG. 6. First, a random document-encryption key is selected (610). As with the selection of the random key-encryption key, the client may access a random bitstream from the server to improve its random-key selection. The plaintext document is encrypted with the document-encryption key (620), and the encrypted document is transmitted to the server (630). This transmission may be further protected from eavesdropping by communicating over SSL, but this is not essential, since the document itself is encrypted by a key that only the client knows. The server stores the encrypted document (640).

Next, the client encrypts the document-encryption key using the public key from its key store (650). (Remember, only the private key from the key store need be encrypted with the key-encryption key. The public key may be stored in plaintext.) Finally, the client sends the encrypted document-encryption key to the server (660), the server stores this key (670), and the client discards the plaintext document encryption key (680).

After upload, the server has: (1) the key-encryption key; (2) the encrypted document-encryption key; and (3) the encrypted document. However, it cannot decrypt the document-encryption key because it does not have the key store, and it cannot decrypt the encrypted document because it cannot decrypt the document-encryption key. Thus, an attacker cannot obtain enough information from the server to learn the contents of the encrypted document. Note that the client did not need the key-encryption key to upload the document. Any person or computer who has the public key from the key store can upload documents to the server for secure storage; however, both the encrypted private key from the key store and the key-encryption key from the server are required to view these documents.

To view the encrypted document, the client (or any attacker) needs: (1) the key store; (2) the key-encryption key; (3) the encrypted document-encryption key; and (4) the encrypted document. The client has (1), while the server has (2), (3) and (4). An attacker must compromise both the client system and the server system to access the document contents.

It is appreciated that, at certain times, the client has all the information it needs to access and/or decrypt the encrypted keys and documents. Consequently, the client could store this information, and an attacker could succeed by compromising only the client. However, in most embodiments, the software the client uses to perform the encryption and decryption is sent from the server, and this software would not offer the client the opportunity to store the sensitive information. If the client nevertheless manages to do so, it has impaired its own security. Such self-inflicted impairment is not addressed by embodiments of this invention.

Figure 7:
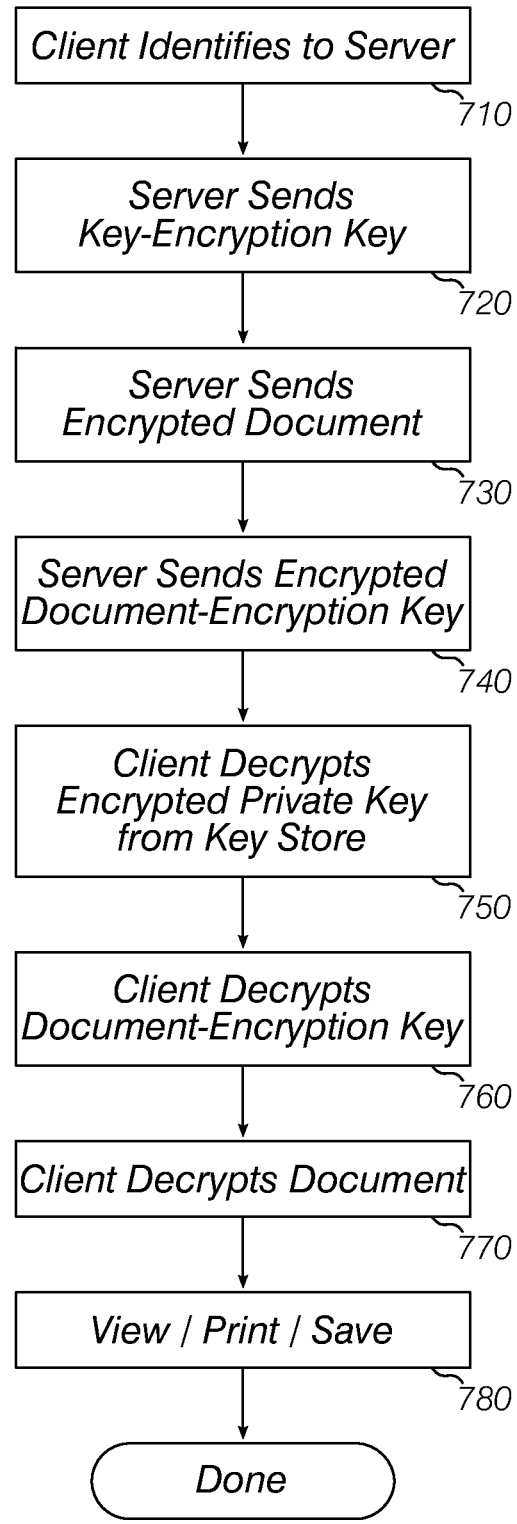
FIG. 7 outlines a method for retrieving and accessing data that has been securely stored at a remote location according to an embodiment of the invention.

This distribution of information among participants permits the server to control access to the securely-stored document, without any ability to view the document contents itself. FIG. 7 outlines a method by which a client can download and view a previously-uploaded encrypted document.

First, the client identifies itself to the server (710). For example, the client may send a username and a secret password, engage in a challenge/response protocol using a One-Time Password ("OTP") token, or provide a biometric impression such as a fingerprint or retina image. Upon successful identification, the server provides the key-encryption key to the client (720). The client requests, and the server transmits, the encrypted document (730) and the encrypted document-encryption key (740). Now, the client has all the pieces of information necessary to recover the document plaintext, so it decrypts its private key from the key store using the key-encryption key (750) and then decrypts the document-encryption key using its private key (760). Finally, the client decrypts the document using the decrypted document-encryption key (770) and can display, print or save the plaintext document (780).

The foregoing protocol effectively separates the identification or authentication of the client from the ability to perform decryption. Both participants in the protocol have essential pieces of the puzzle, so an attacker must compromise both participants in order to obtain access to the secured documents.

It is appreciated that this system requires the generation and encryption of a number of keys. (Document-encryption keys may be re-used, but it is equally easy to generate new ones, and so a preferred embodiment uses a different document encryption key for each document.) For improved efficiency, it is preferred to use a symmetrical encryption algorithm such as DES, 3DES, AES (Rinjdael), or the like to encrypt documents. Keys of 128 or 256 bits often provide adequate levels of security against brute-force attacks when using these algorithms. However, public-key cryptosystems usually require much longer keys (e.g., 2,048 bits or 4,096 bits) to achieve roughly equivalent security, and data to be encrypted should either be similarly-sized, or padded with random bits. Embodiments of the invention preferably create a plurality of random symmetrical encryption keys for use as document encryption keys, so that the total number of bits in the plurality is similar to the number of bits that can be encrypted efficiently using the public-key algorithm. As a concrete example, with 256-bit AES document-encryption keys and a 4,096-bit RSA keypair, an embodiment will create a block of 15 document encryption keys (total 3,840 bits) plus up to 255 extra bits of error correction and other administrative information, and encrypt the entire block in a single operation using the RSA public key. The server may then store a simple integer index as the document-encryption key corresponding to a particular document, where the integer index selects one of the 15 document encryption keys in the block.

Figure 8:
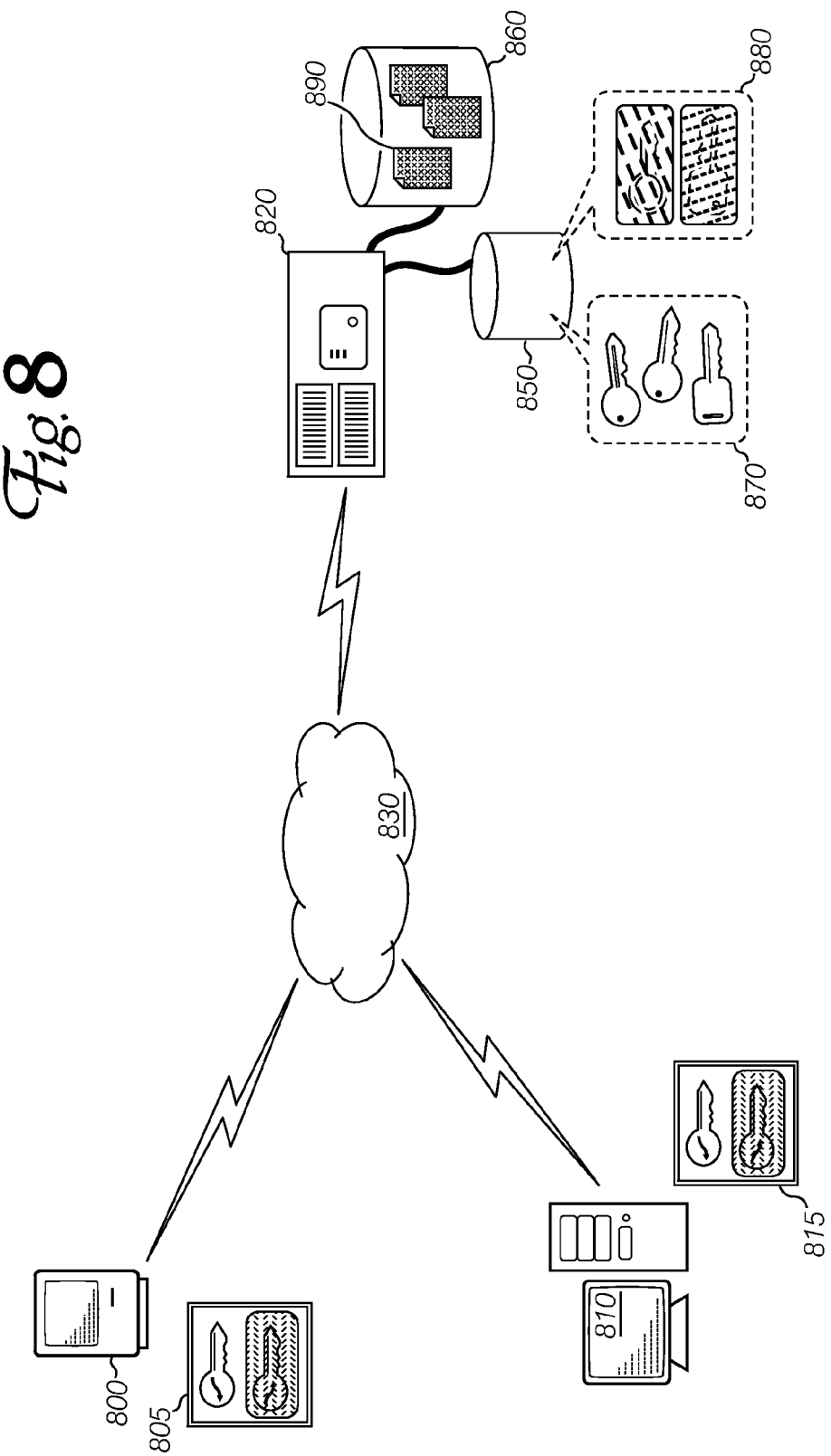
FIG. 8 illustrates some important elements in a multi-user system for secure, remote storage of data.

The client-enrollment, secure document upload, and document decryption processes described above can be incorporated into a general-purpose, multiuser secure document storage service as explained below. Referring to FIG. 8, two client computers 800, 810 interact with a secure remote storage server 820 over a distributed data network 830 such as the Internet. Data comprising interactions between client and server travel over connections using the TCP/IP communication protocol, and SSL is used to protect against eavesdropping and MITM attacks. Each client is enrolled as described with reference to FIG. 5, so each has a key store 805, 815 with the private key encrypted by a key-encryption key, while the server holds the corresponding key-encryption keys. In the enrollment process, each client also provides its public key to the server. The server may store some data on an ordinary mass-storage device 860 such as a hard disk or network file system, while other data may be stored in a Structured Query Language ("SQL") database 850. The decision whether to store data in files or in a database is within the engineering discretion of those of ordinary skill in the art, considering the size or quantity of data and the operations the system may need to perform on it. For example, this Figure shows key-encryption keys 870 and encrypted document-encryption keys 880 stored in SQL database 850, while encrypted documents 890 are stored on mass-storage device 860.

Each client creates and encrypts an initial block of document encryption keys and stores them at the server. When all of these keys have been used to encrypt documents, another block can be created, encrypted and stored in the server's database. To improve security, these additional key blocks may not be associated with the corresponding client. In other words, the responsibility for determining which block of encrypted keys belongs to which client can be left to the client. This can be accomplished by associating each key-block record in the database with a cryptographic hash of the unencrypted keys of the previous block. Since only the client can decrypt a block of keys (by using its key-encryption key to decrypt its private key, then using the private key to decrypt the block of document keys), only the client can compute the correct hash of the block. By using the hash of one block to identify the next block, only the client can locate its next block of keys. (Similarly, the hash of each decrypted block of keys is used to identify the succeeding block.) The server stores blocks of encrypted keys identified by hash values of other blocks of keys, but it cannot determine which block of keys belongs to which client. Thus, for document encryption key indices greater than 15, the server cannot even tell which block of encrypted keys might contain the relevant key for the document.

Figure 9:
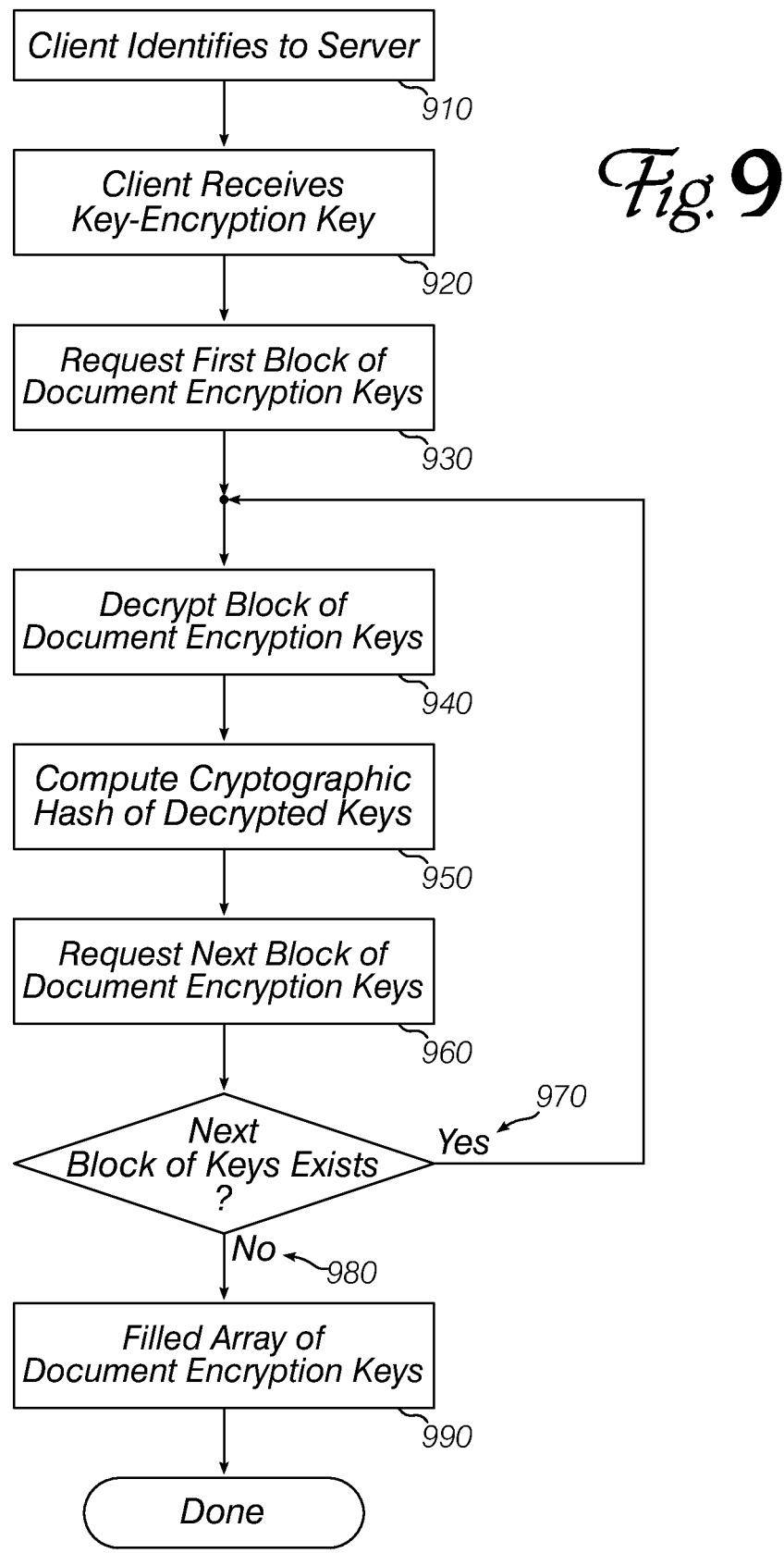
FIG. 9 outlines a method for managing multiple document encryption/decryption keys according to an embodiment of the invention.

Turning briefly to FIG. 9, a client-login method is outlined. As mentioned in FIG. 7, the client first identifies or authenticates itself to the server (910), and upon successful authentication, receives its key-encryption key (920). The client requests its first block of encrypted keys (930), then decrypts them (940), computes their hash (950), and requests the succeeding block of keys (960). If there is a next block of keys (one that matches the cryptographic hash) (970), the block is retrieved and decrypted (940). When the last block has been delivered (980) and no succeeding block with a matching hash is found, the client has filled an array with all of its document-encryption keys (990). (Each of the keys in the array has been decrypted, so the client software should take care not to store the keys in non-volatile memory, and to discard them when a session is completed.)

In a preferred embodiment, software to perform these methods is transmitted from the server when the client logs in, so it is unlikely that rogue client software will compromise security by stealing or storing decrypted keys or documents. Software can be signed using a private key of the server to protect against an attacker tampering with the software while it is stored at the server.

Now, the client can upload documents for secure storage using a method similar to the one described with reference to FIG. 6; or download encrypted documents and decrypt them for viewing or printing using a method similar to the one described with reference to FIG. 7.

Figure 10:
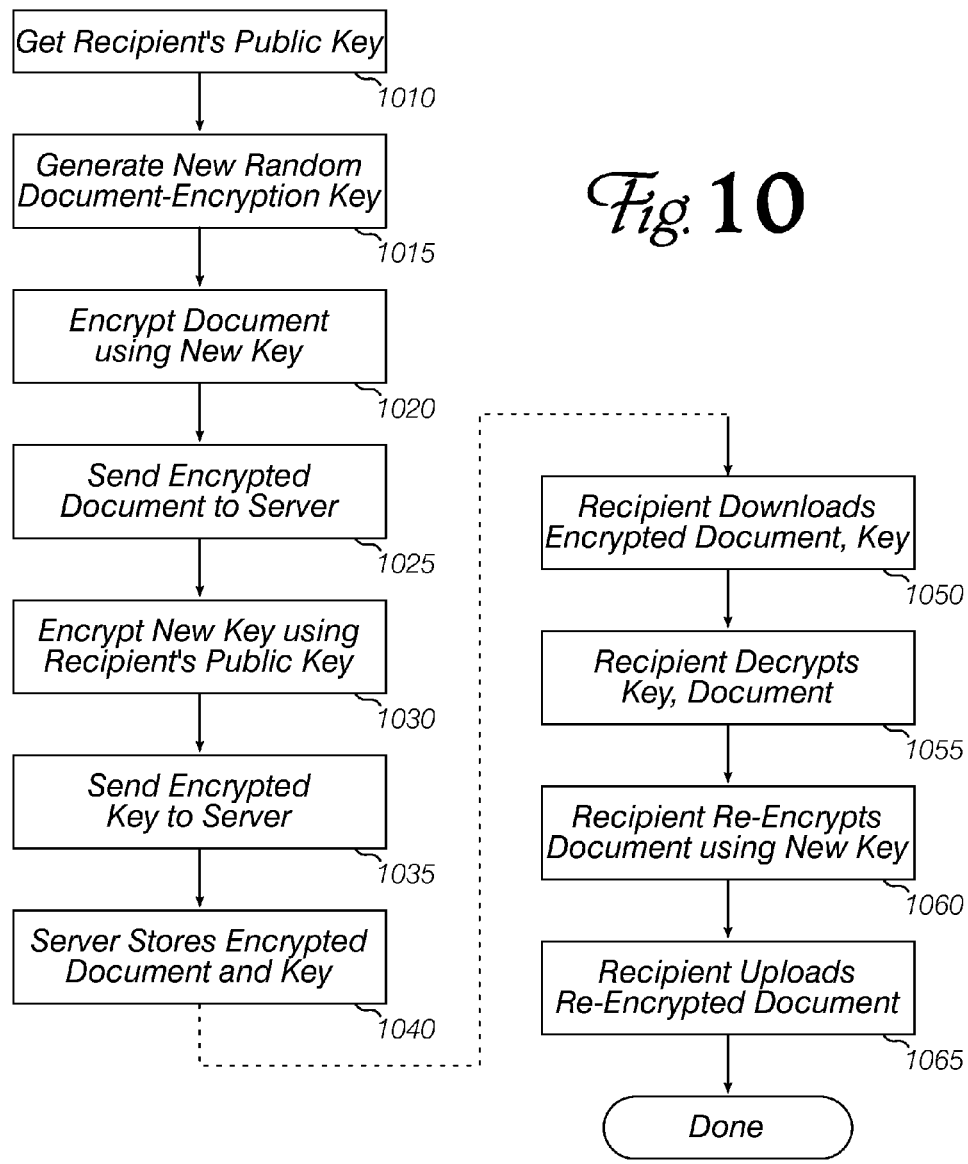
FIG. 10 outlines a method for uploading a document to a secure remote storage system so that a different user can access it.

To give a document to another user (i.e., to upload it for secure storage at the server in a form that only the other user can view), the donating user proceeds as outlined in FIG. 10: obtain the recipient's public key from the server (1010); generate a new random document-encryption key (1015); encrypt the document using the new key (1020); send the encrypted document to the server for storage (1025); encrypt the new document-encryption key with the recipient's public key (1030); and transmit the encrypted document encryption key to the server (1035). The server stores the encrypted document-encryption key so that the recipient can find it and associate it with the appropriate encrypted document (1040). The recipient may download the document and encrypted key (1050), decrypt them (1055), re-encrypt the document using one of the recipient's own document encryption keys (1060) and upload it again (1065) to erase any indication that the document was received from the donating user. Or the recipient may simply continue use the document with the document-encryption key provided by the donor.

Figure 11:
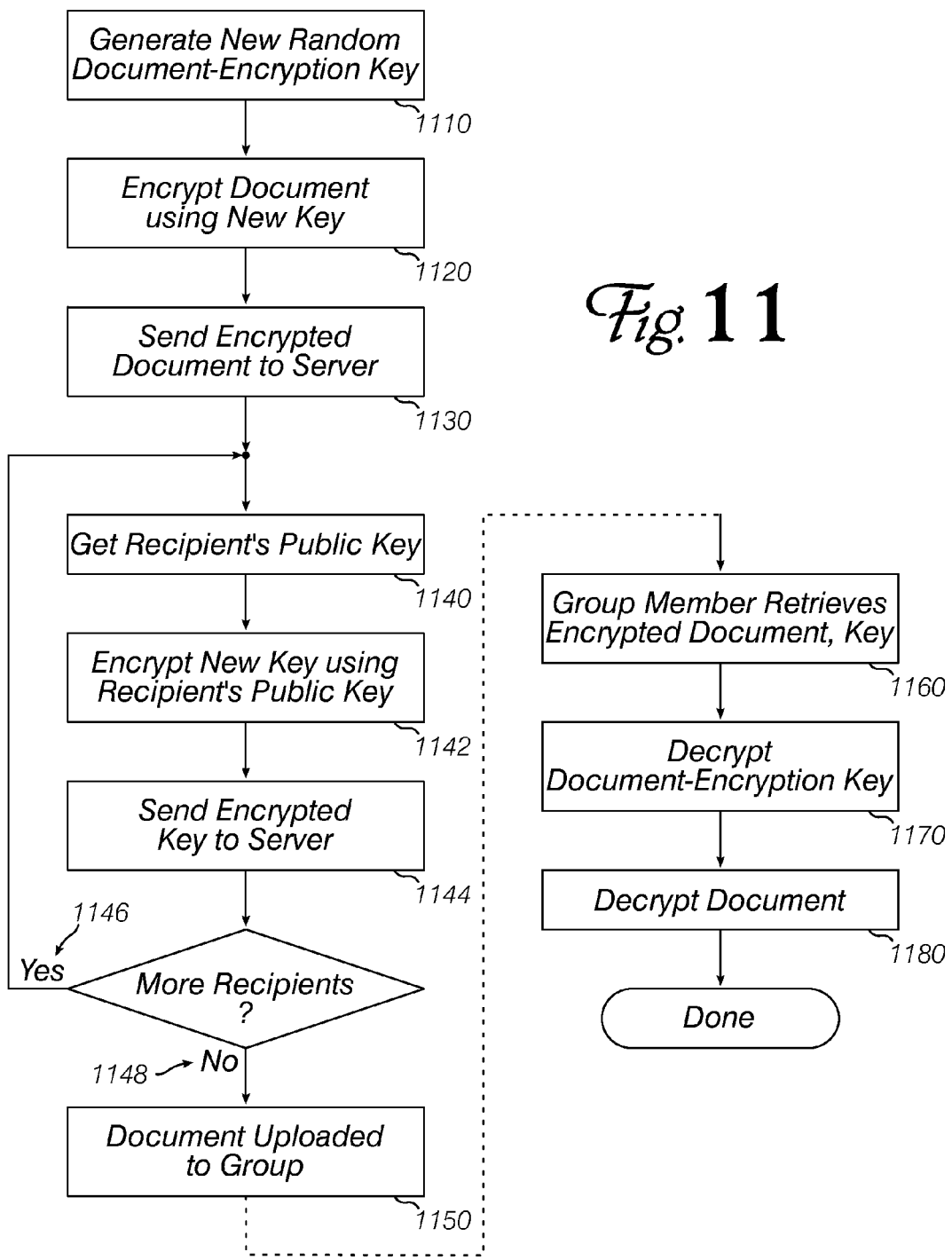
FIG. 11 outlines a method for uploading a document to a secure remote storage system so that a plurality of users can all access it.

A similar procedure can be used to share a document with a group of users (the group may include the original uploading user, or not; and other members of the group may be allowed to change the group membership list by adding or removing members). This is shown in FIG. 11: the donating user generates a new random document-encryption key (1110), encrypts the document (1120) and uploads it to the server (1130). Then, for each user who is to be allowed to view the document, the donating user retrieves the user's public key (1140), encrypts the document-encryption key with the public key (1142), and uploads the encrypted document-encryption key (1144). If there are additional recipients to whom the document is to be sent (1146), steps 1140-1144 are repeated. If all recipients have been processed (1148), then the document has been successfully uploaded to the group (1150). Any user in the group can download the encrypted document and the document-encryption key encrypted with the user's public key (1160), decrypt the document encryption key (1170) and then decrypt the document (1180).

It is important to recall that all encryption and decryption is performed on the client system, using either software installed at the client system, or software transmitted from the server when the client logs in. In a preferred embodiment, software that the client can use to interact with the server and to perform various encryption, decryption and key-generation tasks, is written in the interpreted JavaScript language, and a cryptographically-signed file containing the software is transmitted to the client. The client verifies that the software has not been tampered with, then uses the functions and routines to implement the methods outlined above.

It is appreciated that, although the relatively simple embodiments described above have only a single key-encryption key per user (to control access to the user's key store), other arrangements may "wrap" the key store (or at least the private key) in multiple layers of encryption, where the key at each layer is controlled by a different entity imposing different requirements on the user before allowing him to come closer to accessing his private key. For example, the private key can be encrypted once by a key held by an identifying agency (roughly as described above), which allows its encryption to be opened if the user can establish his identity to the agency's satisfaction. That encrypted key could be encrypted again by a time-stamping agency, which allows its encryption to be opened only if the current date is before (or after) a target date. Successive encryptions act as logical "AND" operators, while multiple encryptions of the same key at a particular layer can serve as logical "OR" operators. Thus, for example, a key store can be prepared so that John Doe (only) can use the private key on or before a target date, while Mary Smith (only) can use the private key after the target date. More complicated combinations of identity, time, and other conditions are possible. One useful condition is the provision of a law-enforcement logical-OR branch: the private key may be made available if a police investigator presents a proper warrant, or if a court issues an appropriate order. The key-store data structure may expose the conditions that must be met to access the private key, or may conceal these conditions to thwart an attacker seeking the shortest or most vulnerable path to accessing the key.

Figure 13:
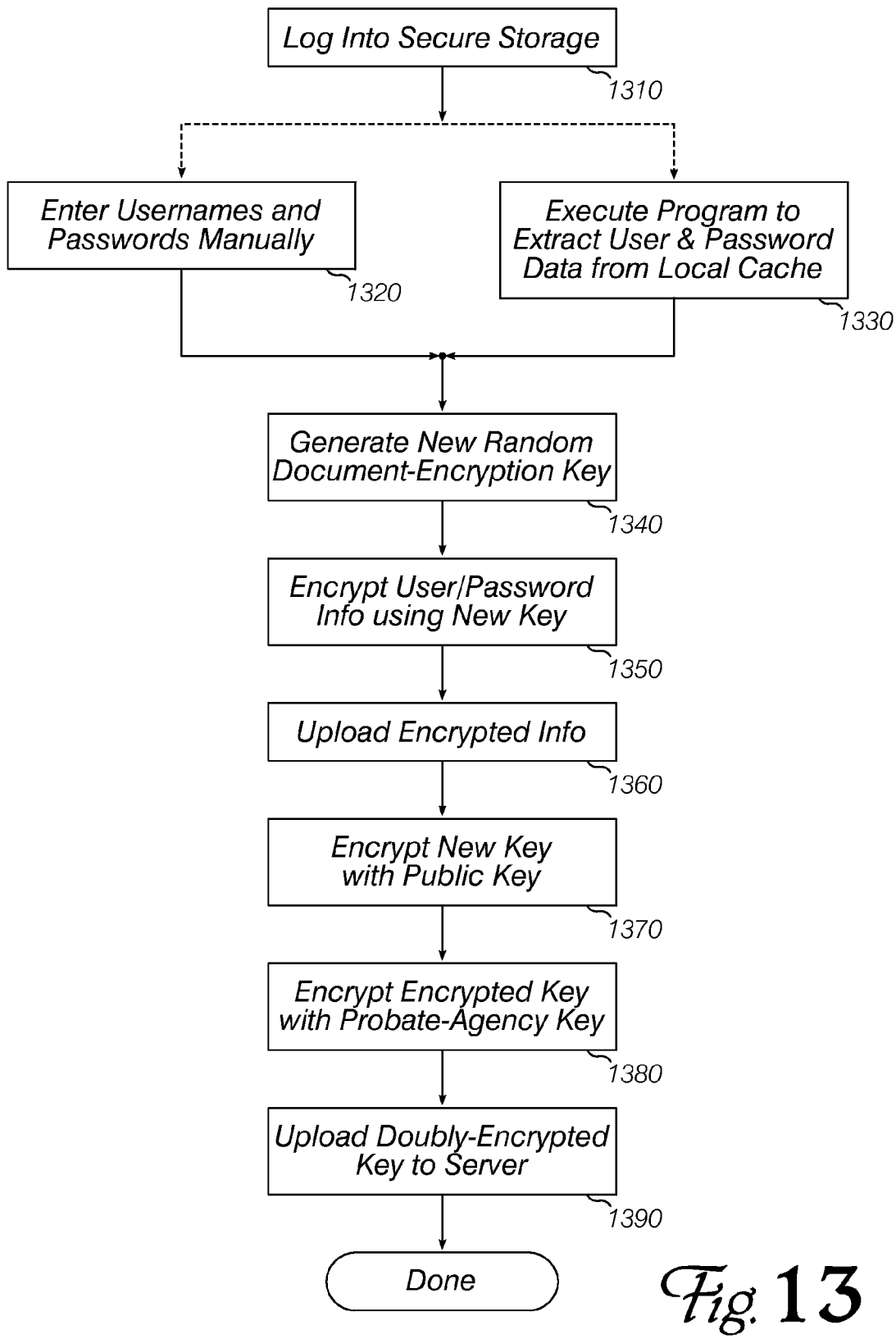
FIG. 13 outlines a method for storing username and password data so that it is available to an executor or personal representative, carrying out the will of a testator after his death.

The foregoing key-access features (in combination with the encrypted storage of an embodiment) may be useful to store sensitive computer data, such as a list of usernames and passwords. One such relevant application is outlined in FIG. 13. A user who has an account with the secure storage system wishes to store a list of website accounts with their corresponding usernames and passwords, for the use of his executor upon his death. The user logs into the secure storage system (1310), and either types username, password and other information manually (1320) or executes a JavaScript (or similar) program to extract data from a password storage database maintained by his browser (1330). A new random document-encryption key is generated (1340) and the new key is used to encrypt the login information (1350). The encrypted information is uploaded to the server (1360). Now, the user encrypts the document encryption key with his own public key (1370) and then encrypts the result with the public key of a probate agency whose terms of service limit the use of the corresponding private key to cases when an executor or personal representative is able to produce a court order appointing the executor to dispose of the user's estate (1380). Finally, this doubly-encrypted key is uploaded to the server (1390).

When the user dies, his executor can convince the probate agency to decrypt the first layer of encryption, and can use the user's private key (which the executor can obtain through another process involving, for example, the user's estate-planning lawyer) to decrypt the second layer. Finally, the doubly-decrypted key can be used to decrypt the file containing the website usernames and passwords, allowing the executor to carry out the user's wishes with respect to the materials stored at those websites.

It should be understood that, despite the many layers of encryption and decryption occurring in methods of an embodiment, almost all of the operations can be performed automatically by server or client-side software. In other words, most of the complexity can be dealt with automatically; a user need not keep track of dozens or hundreds of keys.

The foregoing descriptions have focused on securely storing "files" at a remote server. However, the efficient and flexible key handling of an embodiment permits much finer-grained control over data security than just the file level. For example, an embodiment can use different encryption keys and access policies for individual records in a database, or even individual fields in a record. Consider, for example, the "USER_INFORMATION" database table represented in FIG. 12. Each record describes a user: his name, address, phone number, and an emergency contact. Each field is augmented with a key index number. If the key index is null, the field is unencrypted. If it is a positive integer, then the owner of the record can decrypt the data in the field using his corresponding document-encryption key. If it is a negative integer, then the user must check a group-access table of keys to determine whether there is a document key encrypted with his public key, that he can decrypt to access the field data. In this way, individual fields in a database can be stored in the clear or encrypted, as desired by the user. This functionality can be used in a system that stores metadata about an encrypted file in the database. For example, a user who uploads a file may allow anyone to see the size or last-modification date of the file, but may only allow a select group of people to see the name, and only the user himself may be able to read a short text description or note about the file. The security of encrypted fields in the database is the same as that of encrypted files stored according to an embodiment of the invention: the server does not have enough information to decrypt the fields, so even if an attacker obtains a copy of the database, it cannot make use of the information. Furthermore, since all encryption happens at the client side, plaintext data never passes through the server, and an attacker cannot learn sensitive information by eavesdropping there.

Figure 14:
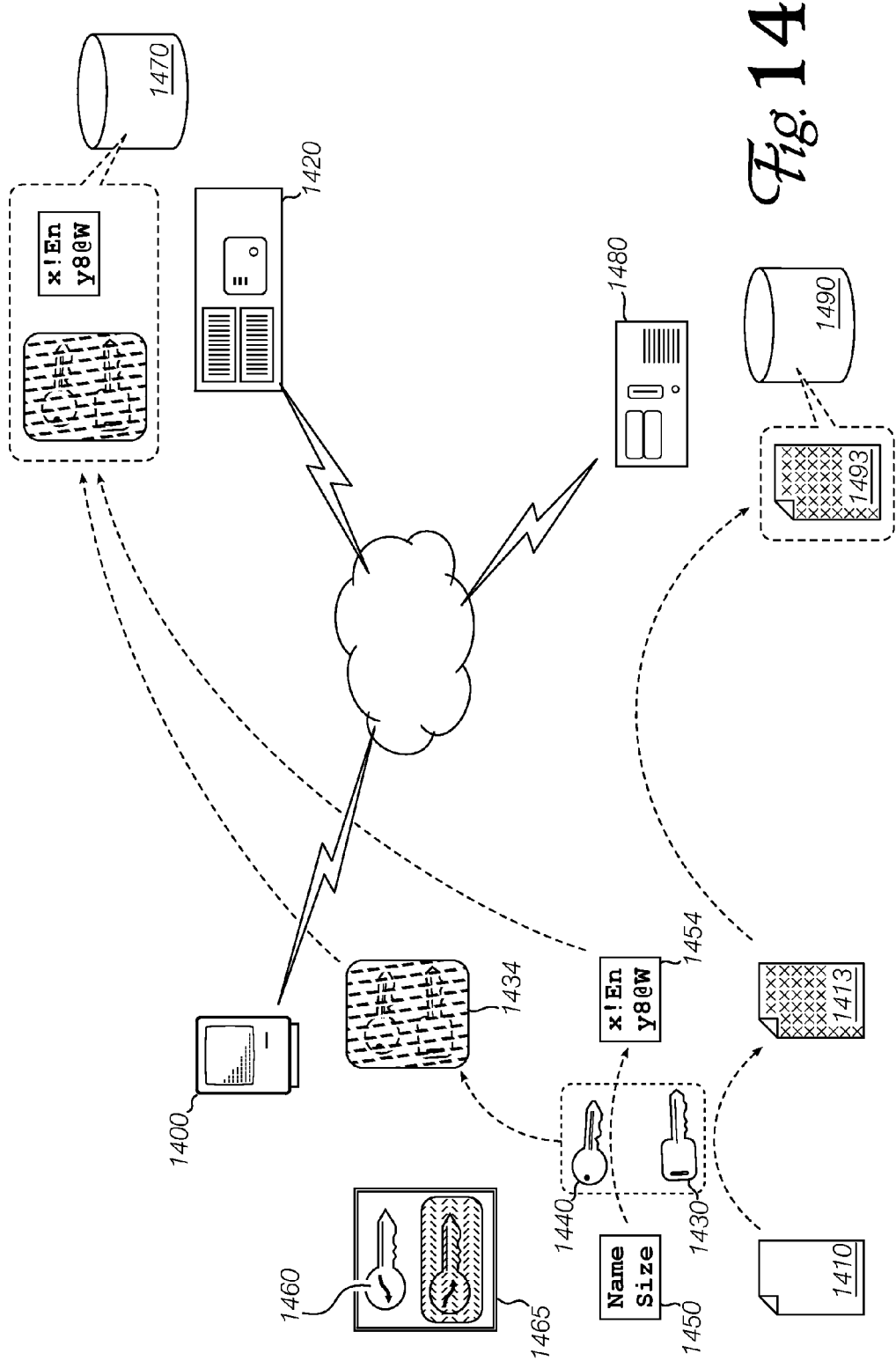
FIG. 14 shows a preferred distribution of functions among several "cloud" services.

A preferred embodiment distributes responsibility for storing various encrypted data items among several servers whose characteristics and pricing offer a favorable overall system operational cost. This is illustrated in FIG. 14. An enrolled user at computer 1400 wishes to store a document 1410 securely at a remote service operated on computer 1420. Software at computer 1400 selects random (or pseudo-random) symmetric keys 1430 and 1440. Key 1430 is used to encrypt document 1410 to produce ciphertext document 1413. Key 1440 is used to encrypt metadata 1450 about document 1410 (for example, the document's name and size) to produce ciphertext 1454.

Next, keys 1440 and 1450 are encrypted using public key 1460, which may be found in key store 1465, to produce encrypted key block 1434. (Note that the user at computer 1400 can encrypt and send document 1410 to a different user by encrypting document keys 1440 and 1450 with the recipient's public key, instead of with his own.) Now, encrypted document metadata 1454 and encrypted key block 1434 are sent to server 1420 for storage in an SQL database 1470 operated there. However, instead of also sending encrypted document 1413 to server 1420, computer 1400 receives a Uniform Resource Locator ("URL") directing it to send the encrypted document 1413 to a different computer 1480 for storage on a mass storage device 1490 located there. This URL (not shown) may be a Cross-Origin Resource Sharing ("CORS") URL, which computer 1400 will interpret to mean that it is acceptable (i.e., not a security violation) to interact with a different computer 1480 in this part of the process.

In this embodiment, the secure remote storage service is directed by software running at server 1420, but various encrypted pieces of data are spread among several server computers. This may allow the service to optimize itself for storage and transmission costs and/or data reliability considerations. In addition, by distributing the information necessary to recover the plaintext document 1410 more widely, it may be possible to improve security, as an attacker must compromise more different systems to obtain the pieces to reconstruct the puzzle.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing computer instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein. In some preferred embodiments, an interpreted language such as JavaScript, or a language that is compiled to pseudo-codes that are interpreted by a virtual machine (such as Java), may provide useful cross-platform functionality, allowing the methods of an embodiment to be deployed on a wide range of computers and software infrastructures. In a JavaScript-based embodiment, an "executable program" may be identical to the "source code" for the same program.

The applications of the present invention have been described largely by reference to specific examples and in terms of particular allocations of functionality to certain hardware and/or software components. However, those of skill in the art will recognize that secure online data storage can also be accomplished by software and hardware that distribute the functions of embodiments of this invention differently than herein described. Such variations and implementations are understood to be captured according to the following claims.

I claim:

1. A method comprising:
    obtaining plaintext data for a plurality of fields of a database record;
    selecting a plurality of random symmetric encryption keys;
    encrypting at least one of the plaintext data for the plurality of database fields using at least one of the plurality of random symmetric encryption keys to produce a database record for storage, at least one of the fields of the database record for storage thus being encrypted;
    arranging the plurality of random symmetric encryption keys into a key block;
    padding the key block with zero or more padding bits to produce a padded key block, a total number of bits of the padded key block similar to but not exceeding a number of bits of a public/private key pair;
    encrypting the padded key block with a public key of the public/private key pair to produce an encrypted key block; and
    transmitting the database record for storage and the encrypted key block to a server.

2. The method of claim 1 wherein fewer than all of the plaintext data are encrypted.

3. The method of claim 1 wherein each of the encrypted plaintext data are encrypted with a different one of the random symmetric encryption keys.

4. The method of claim 1 wherein at least two of the encrypted plaintext data are encrypted with one of the random symmetric encryption keys.

5. The method of claim 1 wherein the padding bits comprise error correction information.

6. The method of claim 1 wherein the padding bits comprise administrative information.

7. The method of claim 1, further comprising:
    storing the fields of the database record for storage in a database, said database thus containing at least one record having one of:
    an unencrypted field and an encrypted field encrypted by a symmetric encryption key; or
    a first field encrypted by a first symmetric encryption key and a second field encrypted by a second, different symmetric encryption key, wherein
    the symmetric encryption key or the first and second symmetric encryption keys are members of the plurality of encryption keys comprising the encrypted key block.

8. The method of claim 1, further comprising:
    storing the encrypted key block in a database.

* * * * *